UNITED STATES PATENT OFFICE.

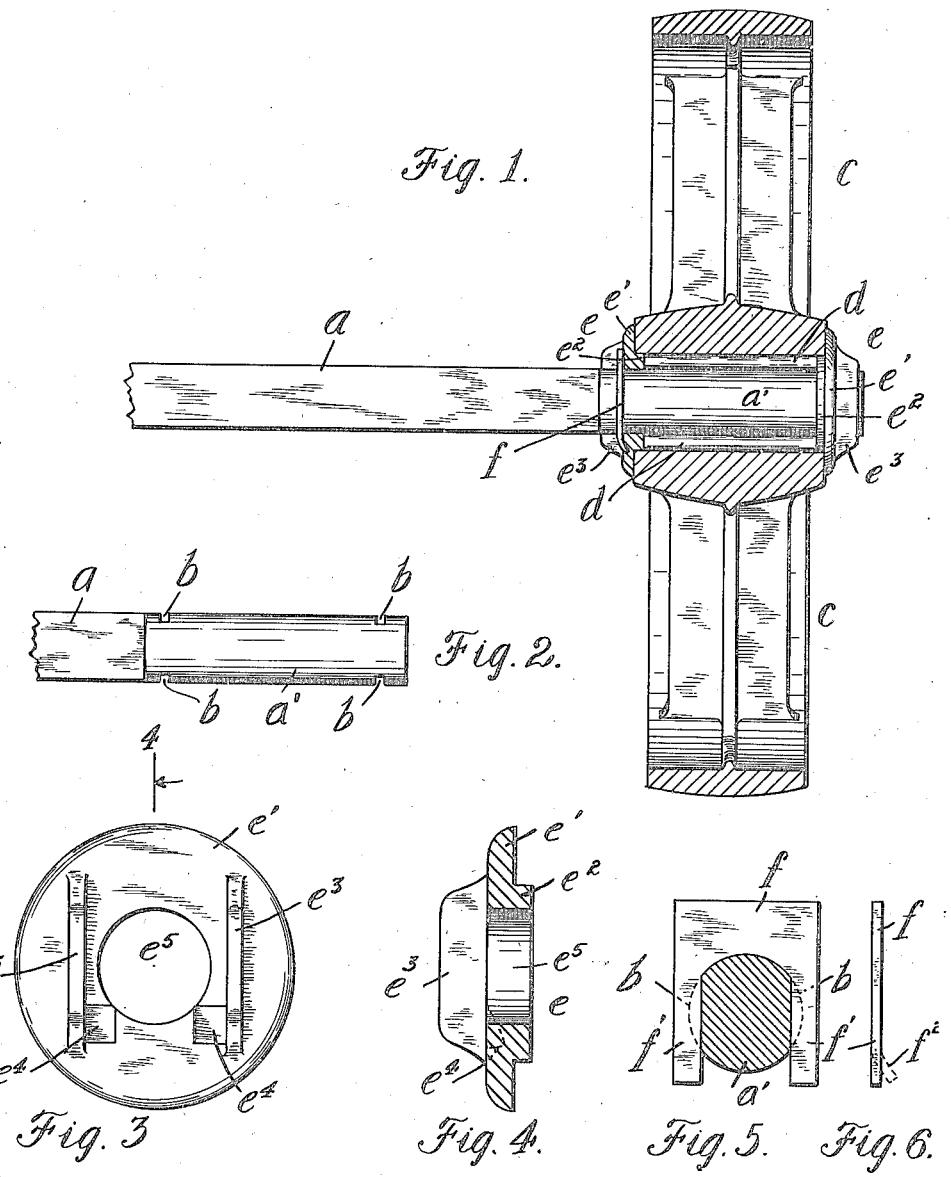

FREDERICK HESSE AND DANIEL MARTIN, OF PORTLAND, OREGON.

MEANS FOR RESTRAINING A PULLEY OR WHEEL ON ITS JOURNAL.

1,197,204.  Specification of Letters Patent.  Patented Sept. 5, 1916.

Application filed October 23, 1914. Serial No. 868,343.

*To all whom it may concern:*

Be it known that we, FREDERICK HESSE and DANIEL MARTIN, citizens of the United States, and residents of the city of Portland, county of Multnomah, State of Oregon, have invented a certain new and useful Improvement in Means for Restraining a Pulley or Wheel on its Journal, of which the following is a specification.

Our invention relates to pulleys and vehicle wheels, and has for its object to provide simple but efficient means for restraining in place a pulley, or wheel, journaled on a shaft or axle, so as to prevent excessive play.

It is further the object of our invention to provide restraining means of the character mentioned which will not require any great mutilation of the shaft or axle, and particularly not require any hole cut through the shaft, as, for example, required for a cotter-pin.

The means whereby we attain our object are hereinafter fully described, reference being had to the accompanying drawings, in which:

Figure 1 is a sectional view showing the journal portion of a shaft on which is mounted a crown-face pulley, and illustrates the means invented by us for the purposes set forth; Fig. 2 is a top view of the journal portion of the shaft; Fig. 3 is a larger-scale outer face elevation of one of the restraining pieces included in our invention; Fig. 4 is a vertical section on the line 4 of Fig. 3; and Figs. 5 and 6 show a front and an end elevation, respectively, of the cotter member of our restraining means.

We have illustrated our invention as applied to the journaling of a pulley on a shaft. The square shaft, $a$, has a journal-end $a'$ provided with a pair of parallel grooves $b$. The pulley, $c$, is mounted on the said journal-end $a'$ of the shaft, and common roller bearings, $d$, are used for facilitating the free rotation of the pulley. The restraining elements, $e$, mounted on the journal end $a'$, on either side of the pulley $c$, comprise each a washer or disk-like piece $e'$ made with a central aperture $e^5$ and a boss $e^2$, which fits in the bore of the wheel and serves as an abutment for the ends of the roller bearings $d$ to work against. On the outer face of the restraining piece $e'$ are two parallel ribs $e^3$ located on either side of the aperture or eye $e^5$, and between these ribs and the eye are provided recesses $e^4$. See Fig. 3.

A bifurcated cotter $f$, shown in detail in Figs. 5 and 6, has legs $f'$ which straddle the journal-end $a'$, being seated in the grooves $b$ of the latter. In practice this cotter is placed between the lugs $e^3$ and, when in place, the ends of the legs $f'$ are bent into the recesses $e^4$ of the piece $e'$, as shown by $f^2$, thereby holding the latter against rotary movement on the restraining piece $e'$.

Since the restraining elements are placed on both sides of the pulley $c$, the latter will be effectively held against undue play on the shaft, the bosses $e^2$ serving to properly space the devices mounted on the journal ends, and restraining them against undue longitudinal movement, and the inner faces of the restraining pieces $e'$, will present a wearing surface to the outer faces of the pulley.

As is apparent, the manner of mounting the cotter on the shaft is purposed to restrain the latter against rotary or longitudinal movement on the journal end.

The use of our invention for journaling wheels on the ends of a vehicle axle is evident without further description. And, of course, it is not essential that the details of our invention be literally followed as given above.

We claim:

In combination with a journal having parallel transverse grooves, a disk-like restraining member made with a central aperture and parallel guide ribs, recesses in the face of said restraining member, a bifurcated cotter positioned between the guide ribs, the ribs of said cotter being adapted to engage the grooves of the journal and their extremities bent so as to engage the recesses.

FREDERICK HESSE.
DANIEL MARTIN.

Witnesses:
 CLIFFORD L. REED,
 WM. C. SCHMITT.